(12) United States Patent
Choi (10) Patent No.: US 6,487,987 B1
(45) Date of Patent: Dec. 3, 2002

(54) AUTOMATIC FODDER SUPPLYING APPARATUS

(76) Inventor: Chul-Soo Choi, Sindonga Apt. 2-501, 1333, Seocho-Dong, Seocho-ku, Seoul, 137-772 (KR)

( * ) Notice: Subject to any disclaimer, the term of this patent is extended or adjusted under 35 U.S.C. 154(b) by 287 days.

(21) Appl. No.: 10/089,589

(22) PCT Filed: Sep. 26, 2000

(86) PCT No.: PCT/KR00/01073
§ 371 (c)(1),
(2), (4) Date: Mar. 29, 2002

(87) PCT Pub. No.: WO01/22808
PCT Pub. Date: Apr. 5, 2001

(30) Foreign Application Priority Data

Sep. 30, 1999 (KR) .......................... 99-42094

(51) Int. Cl.[7] .................................. A01K 5/02
(52) U.S. Cl. ................ 119/51.5; 919/51.11; 919/52.1
(58) Field of Search .................. 119/51.11, 51.5, 119/52.1, 52.4, 53, 53.5, 54, 51.02

(56) References Cited

U.S. PATENT DOCUMENTS

| | | | | |
|---|---|---|---|---|
| 2,793,791 A | * | 5/1957 | Clark | 119/51.11 |
| 3,171,385 A | * | 3/1965 | Decker et al. | 119/51.11 |
| 3,527,191 A | * | 9/1970 | Kawecki et al. | 119/51.11 |
| 3,648,660 A | * | 3/1972 | Esquival | 119/51.11 |
| 3,800,745 A | * | 4/1974 | Fassauer | 119/51.11 |
| 4,055,146 A | * | 10/1977 | Smrt | 119/51.11 |
| 4,079,699 A | * | 3/1978 | Longmore et al. | 119/51.11 |
| 4,235,200 A | * | 11/1980 | Shay | 119/51.11 |
| 4,279,221 A | * | 7/1981 | Arvizu | 119/51.11 |
| 4,284,035 A | * | 8/1981 | White | 119/51.11 |
| 4,722,300 A | * | 2/1988 | Walker et al. | 119/51.11 |
| 4,735,171 A | * | 4/1988 | Essex | 119/51.12 |
| 4,993,364 A | * | 2/1991 | Hessenauer | 119/51.11 |
| 5,199,381 A | * | 4/1993 | Masopust | 119/51.04 |
| 5,230,300 A | | 7/1993 | Mezhinsky | |
| 5,588,394 A | * | 12/1996 | Balistreri | 119/51.11 |
| 5,873,326 A | * | 2/1999 | Davet et al. | 119/245 |
| 6,196,158 B1 | * | 3/2001 | Yang | 119/51.11 |
| 6,263,833 B1 | * | 7/2001 | Runyan et al. | 119/51.11 |
| 2002/0096120 A1 | * | 7/2002 | Busha | 119/51.5 |

FOREIGN PATENT DOCUMENTS

JP 889119 A1 4/1996

* cited by examiner

Primary Examiner—Yvonne R. Abbott
(74) Attorney, Agent, or Firm—Fulbright & Jaworski LLP (57) ABSTRACT

The present invention relates to an automatic fodder supplying apparatus for supplying fodder and water to various animals at home, a cage, and a laboratory, in particular to an automatic fodder supplying apparatus which is capable of supplying consecutively and smoothly a certain amount of fodder according to the kind or condition of the animal in accordance with an interval set with a timer in everyday or long time absence or trip, manufacturing easily, and using conveniently and stably for a long time. The automatic fodder supplying apparatus in accordance with the present invention comprises a fodder supply box including a supply unit containing the fodder, a rotary barrel installed inside of the fodder supply box so as to be rotational and including a receiving groove inside, a shaft combined to the rotary barrel to the axial direction, a decelaration motor combined to the shaft, and a rotation detector including a micro switch fixedly combined to the side walls of the fodder supply box and an operator fixedly combined to the shaft.

11 Claims, 8 Drawing Sheets

AUTOMATIC FODDER SUPPLYING APPARATUS

TECHNICAL FIELD

The present invention relates to an automatic fodder supplying apparatus, in particular to an automatic fodder supplying apparatus which is capable of supplying a certain amount of fodder periodically in accordance with a preset interval.

BACKGROUND ART

Generally, in breeding various animals including pets such as a dog, fodder is manually provided to the pets as occasion demands, however it is troublesome for a breeder to supply manually the fodder to the pet, especially when the breeder goes out for a long time, it is impossible to supply the fodder to the pet. Accordingly, in order to solve the inefficiency, an automatic fodder supplying apparatus for supplying automatically the fodder and water has been developed and used.

In the conventional automatic fodder supplying apparatus, a feed screw is installed on the lower portion of a fodder supply box, and the fodder is automatically discharged into the fodder supply box under the influence of gravity by rotating and reverse-rotating periodically the feed screw by using rotating force of a deceleration motor in accordance with the control of a control unit.

However, in supply of the fodder having various shapes, sizes, mass per element such as a powder shape, a granule shape, a cookie shape, a bone shape separately or so as to be mixed, the fodder can be crushed and its shape might have been damaged due to the rotation of the feed screw, when the bone shape fodder is caught between the outer circumference and inner circumference of the screw, it interrupts the rotation of the screw, even more the apparatus might be broken.

SUMMARY OF INVENTION

Accordingly, in order to solve the above- mentioned problems the object of the present invention is to provide an automatic fodder supplying apparatus for supplying fodder and water to various animals at home, a cage, and a laboratory which is capable of supplying consecutively and smoothly a certain amount of fodder according to the kind or condition of the animal in accordance with an interval set with a timer in everyday or long time absence or trip, manufacturing easily, and using conveniently and stably for a long time.

In order to achieve the above-mentioned objects, the automatic fodder supplying apparatus in accordance with the present invention comprises a fodder supply box including a supply unit containing the fodder, a rotary barrel installed inside of the fodder supply box so as to be rotational and including a receiving groove inside, a shaft combined to the rotary barrel to the axial direction, a deceleration motor combined to the shaft, and a rotation detection means including a micro switch fixedly combined to the side wall of the fodder supply box and an operator fixedly combined to the shaft.

DETAILED DESCRIPTION OF THE INVENTION

Hereinafter, an automatic fodder supplying apparatus in accordance with the present invention will now be described in detail with reference to accompanying drawings.

There can be a plurality of embodiments of the present invention, hereinafter the preferred embodiment of the present invention will now be described.

Figure 1:
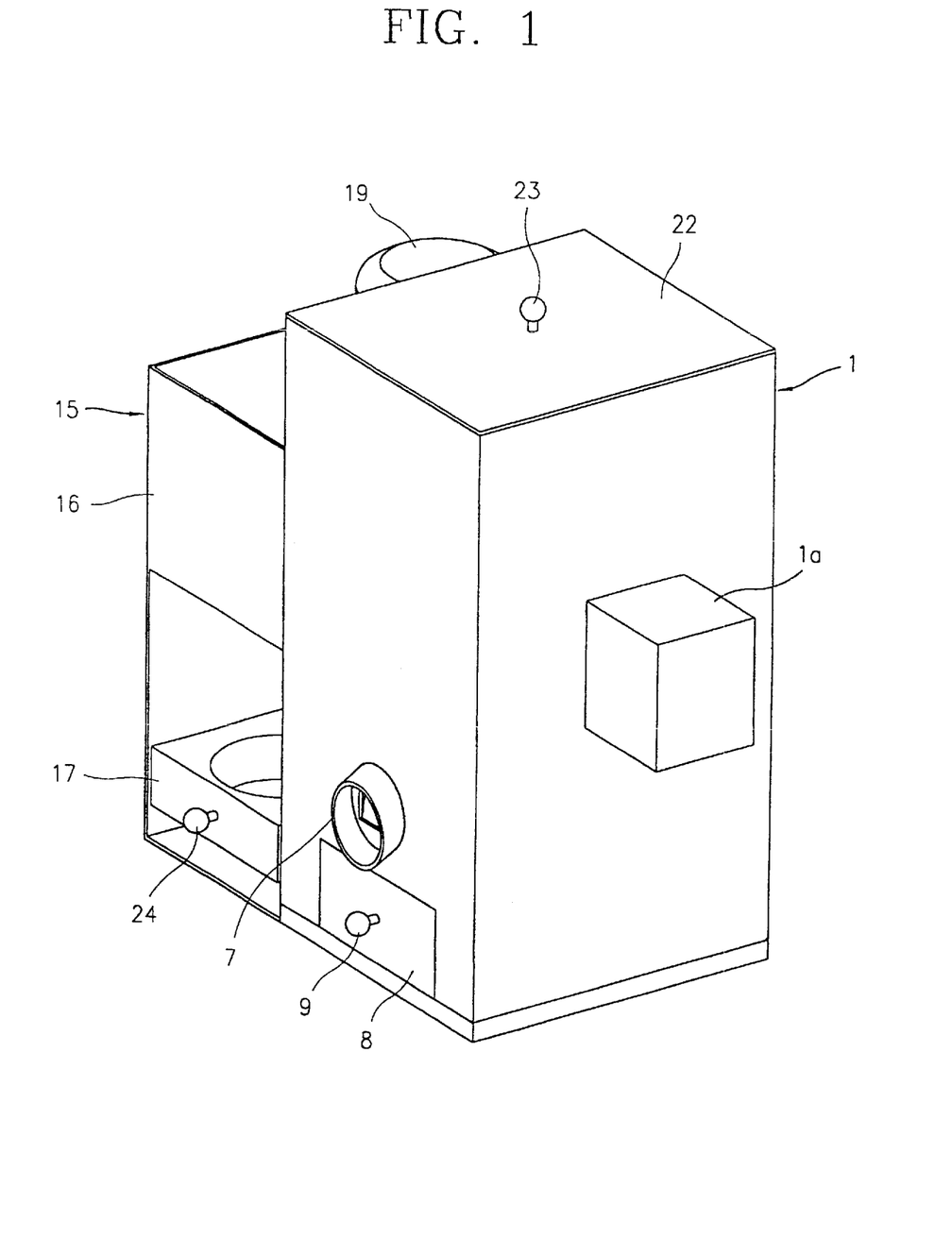
FIG. 1 is a perspective view illustrating overall outward of an a utomatic fodder supplying apparatus in accordance with the present invention.
Figure 2:
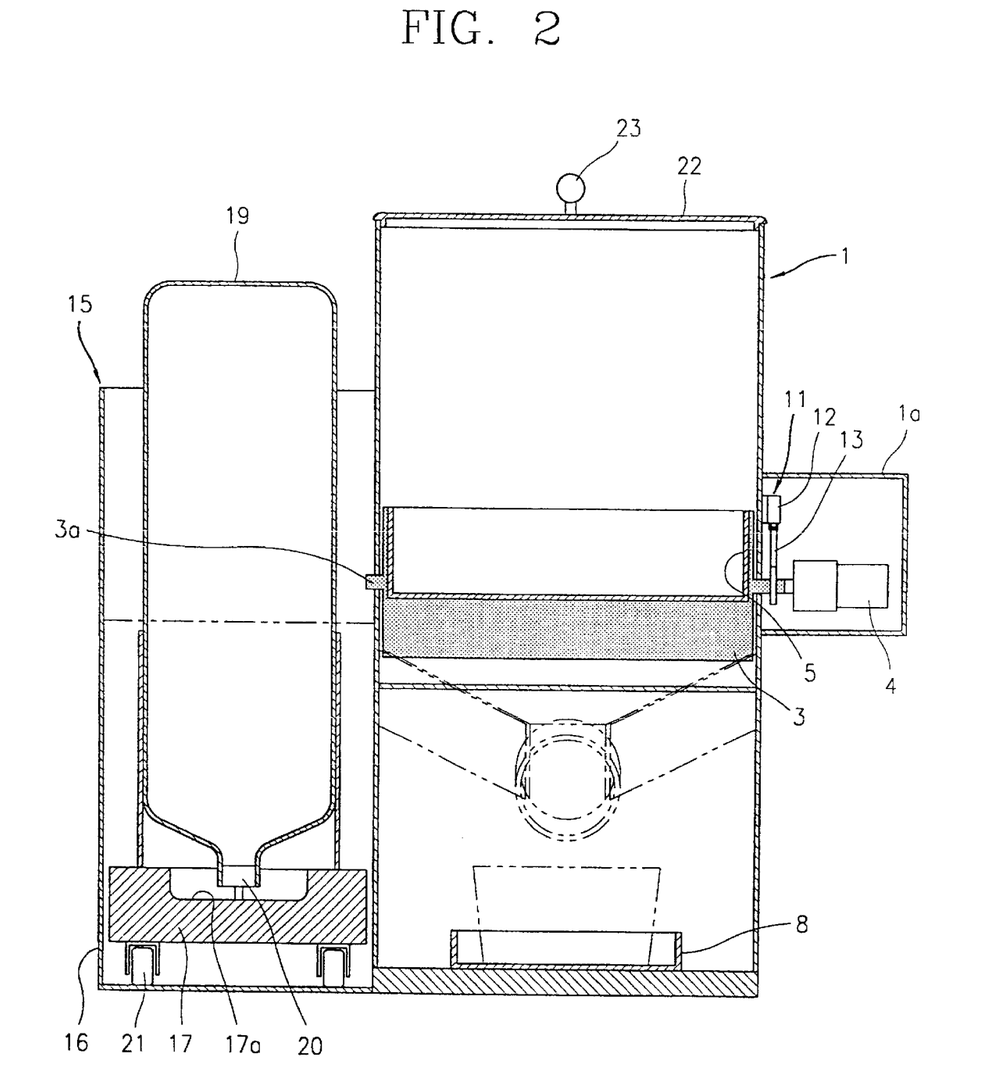
FIG. 2 is a cross-sectional view illustrating an automatic fodder supplying apparatus in accordance with the present invention.

As depicted in FIGS. 1 and 2, the automatic fodder supplying apparatus in accordance with the present invention comprises a deceleration motor cover 1a on a certain portion of the side wall of a fodder supply box 1 having a rectangular shape, and a water supply means 15 on the other side of the fodder supply 1.

Figure 3:
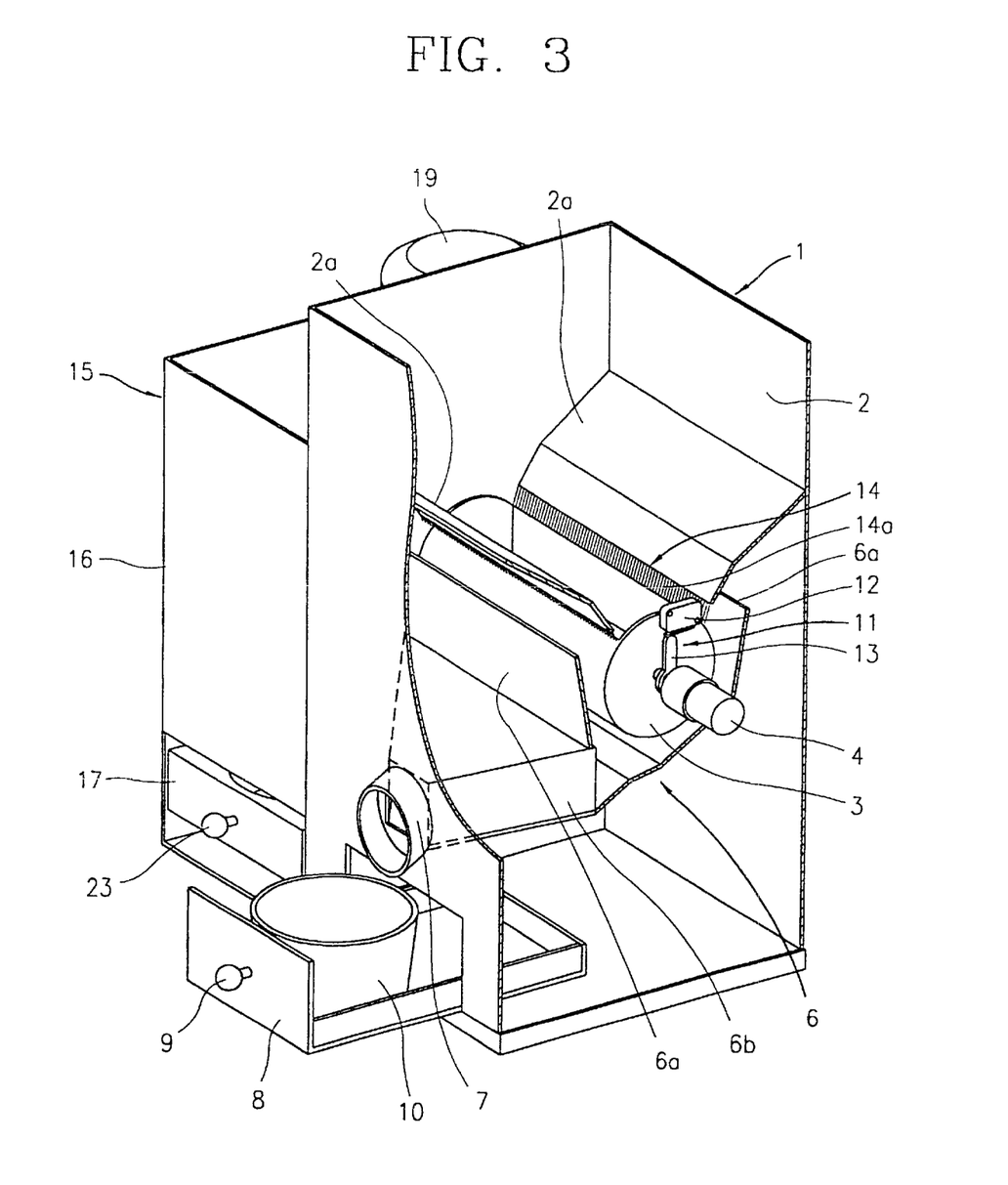
FIG. 3 is a perspective view illustrating a partly crossed fodder supply box of a fodder supply box in accordance with the present invention.
Figure 4:
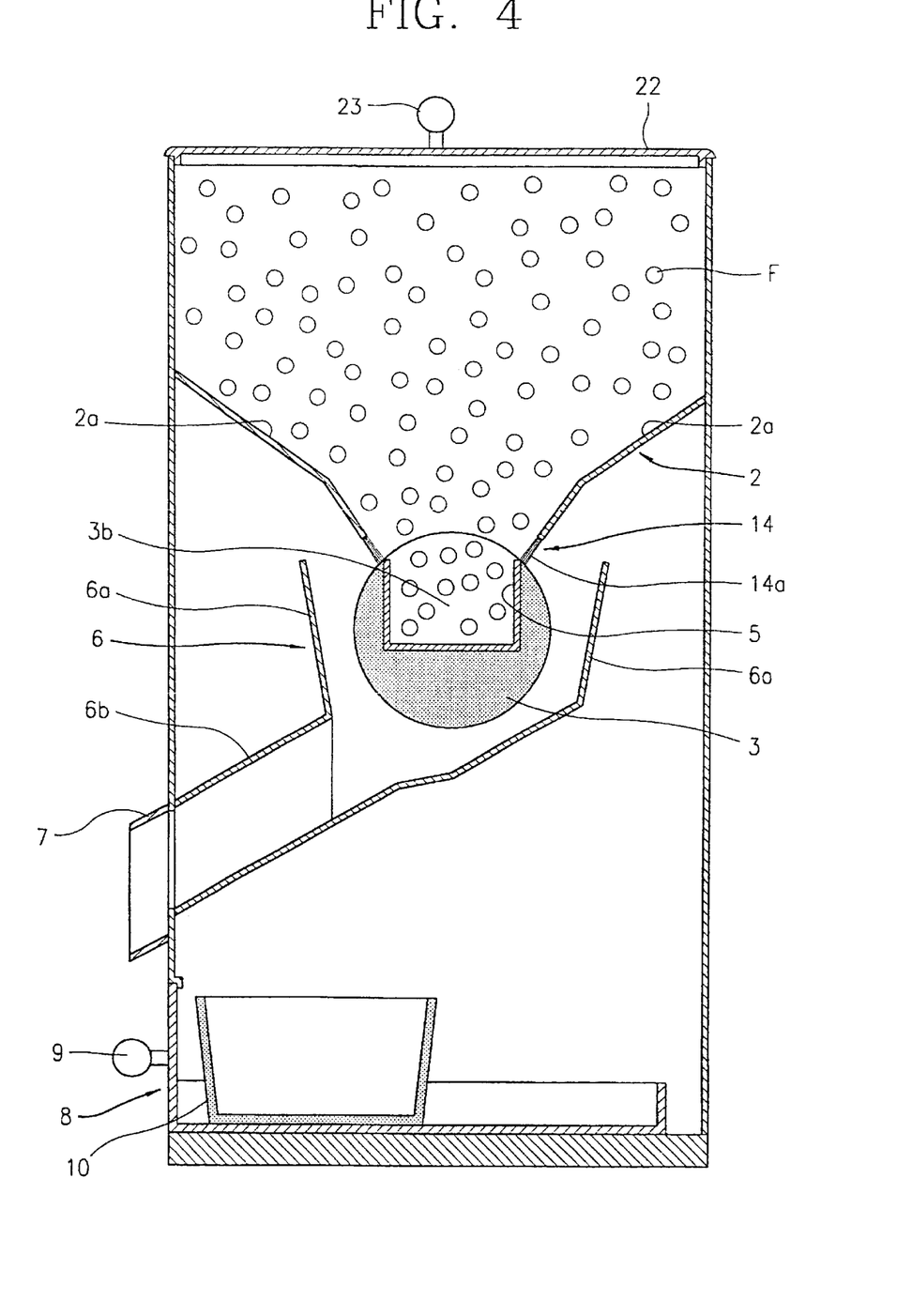
FIG. 4 is a cross-sectional view illustrating side part of a fodder supply box of an automatic fodder supplying apparatus in accordance with the present invention.

First, the construction of the food supply box 1 will now be described, as depicted in FIGS. 3 and 4, a supply unit 2 having a hopper shape for mounting fodder F is formed on the inner upper portion of the fodder supply box 1, and a rotary barrel 3 is installed on the inner center portion of the fodder supply box 1 so as to be rotatable centering around a shaft 3a combined to the rotary barrel 3 to the axial direction in order to be rotated by a deceleration motor 4.

And, inside of the fodder supply box 1, a discharge guide member 6 for guiding the fodder F discharged from a constant feed case 5 by the rotation of the rotary barrel 3 is formed on the lower portion of the rotary barrel 3, a discharge portion 7 where the fodder F is discharged is formed on the front lower portion of the fodder supply box 1, and a cover 22 having a holder 23 on the upper surface is combined to the upper portion of the fodder supply box 1.

The discharge guide member 6 comprises a second guide plate 6a placed so as to surround the both sides and lower portion of the rotary barrel 3 inside of the fodder supply box 1, and a discharge guide unit 6b having a hopper shape combined between the second guide plate 6a and discharge portion 7.

Figure 5A:
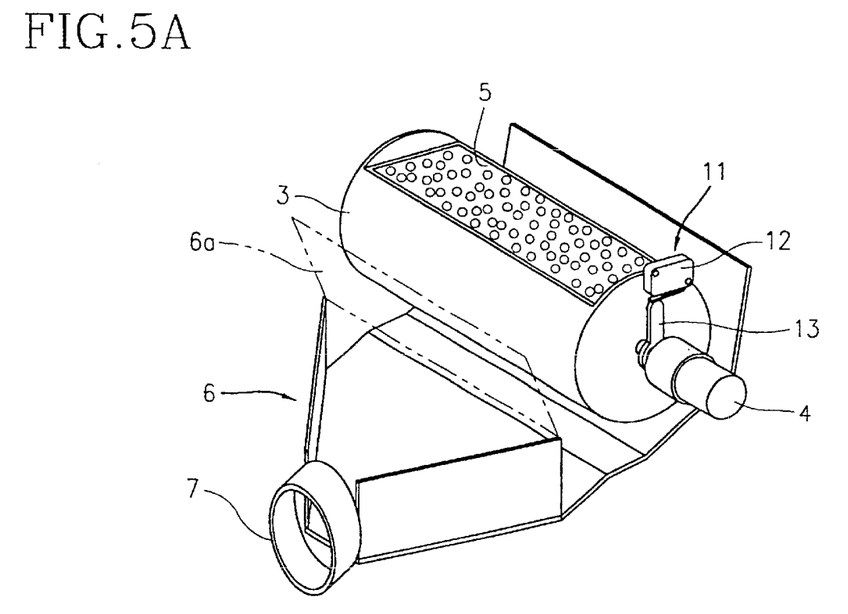
FIG. 5A is a perspective view illustrating a stop position of a rotary barrel constructing an automatic fodder supplying apparatus in accordance with the present invention.
Figure 5B:
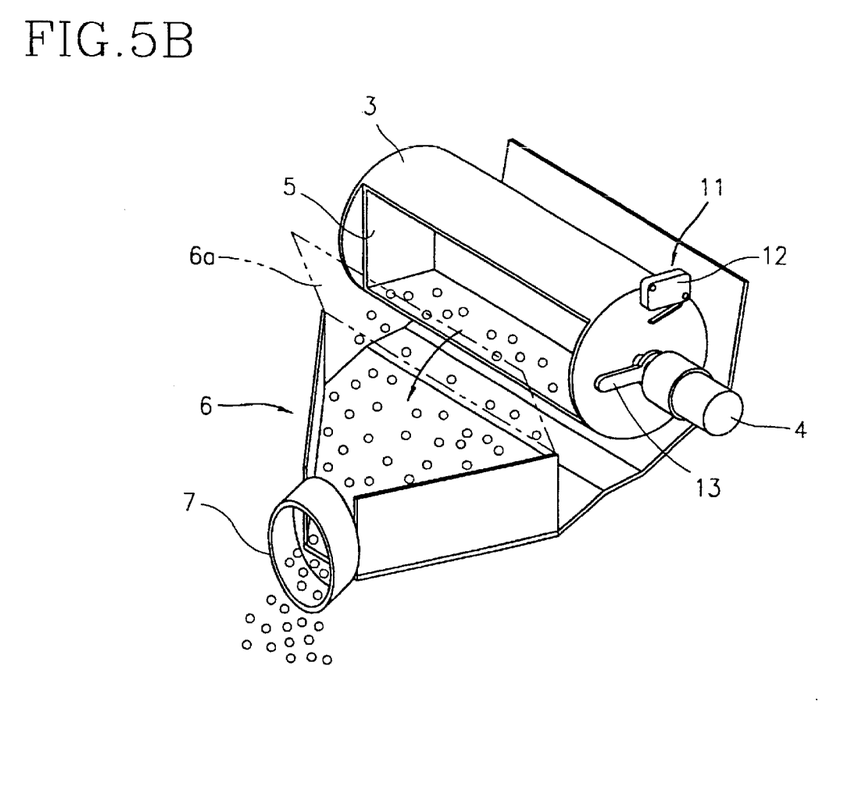
FIG. 5B is a perspective view illustrating a discharge position of a rotary barrel constructing an automatic fodder supplying apparatus in accordance with the present invention.

And, a first slide case 8 having a holder 9 on the front surface is combined to the front lower portion of the fodder supply box 1 so as to be closed/open as a drawer type, and a feeder 10 for putting the fodder F discharged from the discharge portion 7 is inserted into the first slide case 8 As depicted in FIGS. 5A and 5B, the rotation times of the rotary barrel 3 is detected by a rotation detection means 11, in more detail, the rotation detection means 11 comprises a micro switch 12 fixedly combined to the side wall of the fodder supply box 1 so as to be adjacent to the shaft 3a of the rotary barrel 3, and an operator 13 fixedly combined to the shaft 3a of the rotary barrel 3 in order to turn on or off the micro switch 12 by rotating while inter-locking with the shaft 3a.

Accordingly, the rotary barrel 3 rotates periodically by the deceleration motor 4 in accordance with a timer (not shown) included on a control unit (not shown) combined to a certain portion of the fodder supply box 1 and the control of the rotation detection means 11.

In other words, as depicted in FIGS. 5A and 5B, when the rotary barrel 3 rotates one time, the operator 13 makes the control unit detect it by contacting to a contact point of the micro switch 12, when a contact signal of the micro switch 12 is transmitted to the control unit, the control unit stops the deceleration motor 4, and the rotary barrel 3 does not rotate until the set time has passed.

Meanwhile, as depicted in FIGS. 3 and 4, in the supply unit 2 having the hopper shape, first guide plates 2a, 2a are separately combined to the upper both side surfaces of the fodder supply box 1 so as to form an opening, and are fixed so as to be inclined in order to put the fodder F into the receiving groove 3b, and a noise and fodder lost prevention member 14 is added on the lower portion of the first guide plates 2a, 2a.

It is advisable to use natural birth or synthetic resin seam for the noise and fodder lost prevention member 14, it can be also possible to use a rubber plate etc., the noise and fodder lost prevention member 14 can prevent noise and lost of the fodder F in the operation by preventing friction between the rotary barrel 3 and the lower portions of the first guide plates 2a, 2a in the rotation of the rotary barrel 3.

Figure 6:
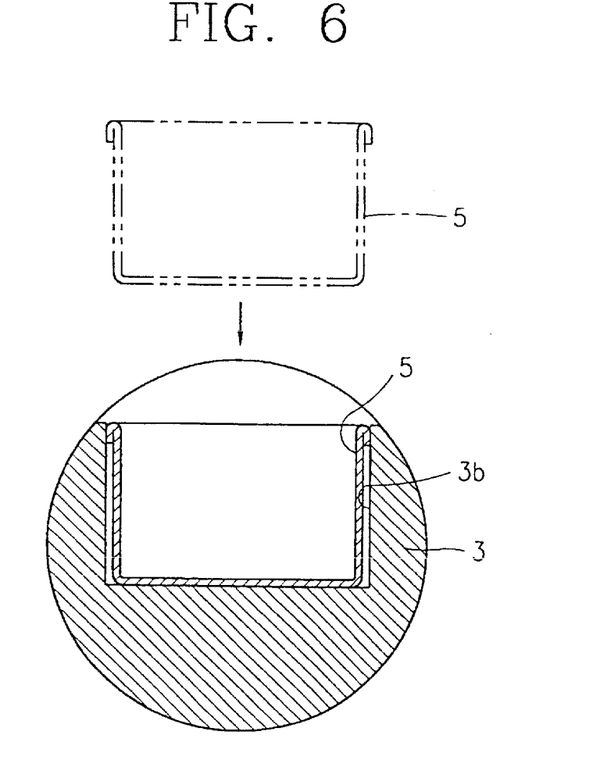
FIG. 6 is an assembly diagram illustrating a combination construction of a constant feed case to a rotary barrel of an automatic fodder supplying apparatus in accordance with the present invention.
Figure 7:
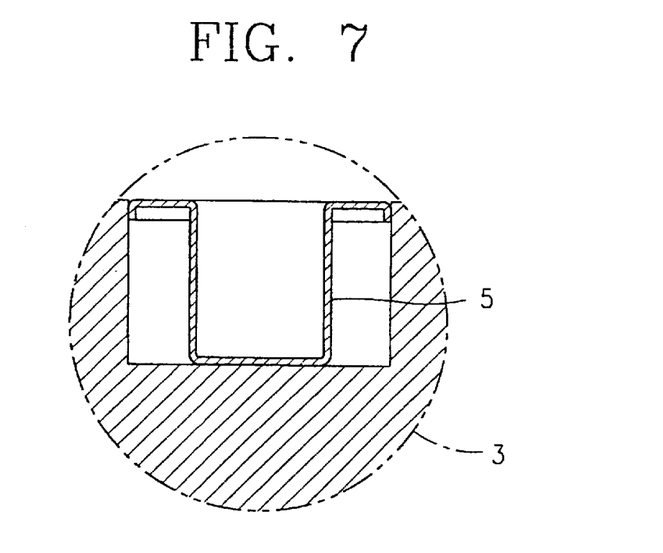
FIG. 7 is a sectional view illustrating the other embodiment of a constant feed case of an automatic fodder supplying apparatus in accordance with the present invention.

In the present invention, as depicted in FIGS. 6 and 7, different standards constant feed case 5 can be selectively inserted into the receiving groove 3b of the rotary barrel 3 and used in accordance with the kind of the animal and condition of breeding, the amount of the fodder can be adjusted with consecutive operation up to about 81 times by controlling the rotation times of the deceleration motor 4, and the fodder F can be directly put into the receiving groove 3b without combining the constant feed case 5 to the receiving groove 3b of the rotary barrel 3 in case of needs.

And, in the present invention, when the rotary barrel 3 rotates one time, in other words, when the fodder F put into the constant feed case 5 is discharged into the feeder 10, a display means for generating sound such as a melody in order to inform it to the animal such as a sound generation means and/or lighting means is comprised, the sound occurrence means and lighting means can be operated by a detect signal of the detect means 11.

In addition, it is not depicted, a ultraviolet sterilization lamp is installed on the lower surface of the cover 22 in order to prevent rotten of the fodder in long-term custody.

Figure 8:
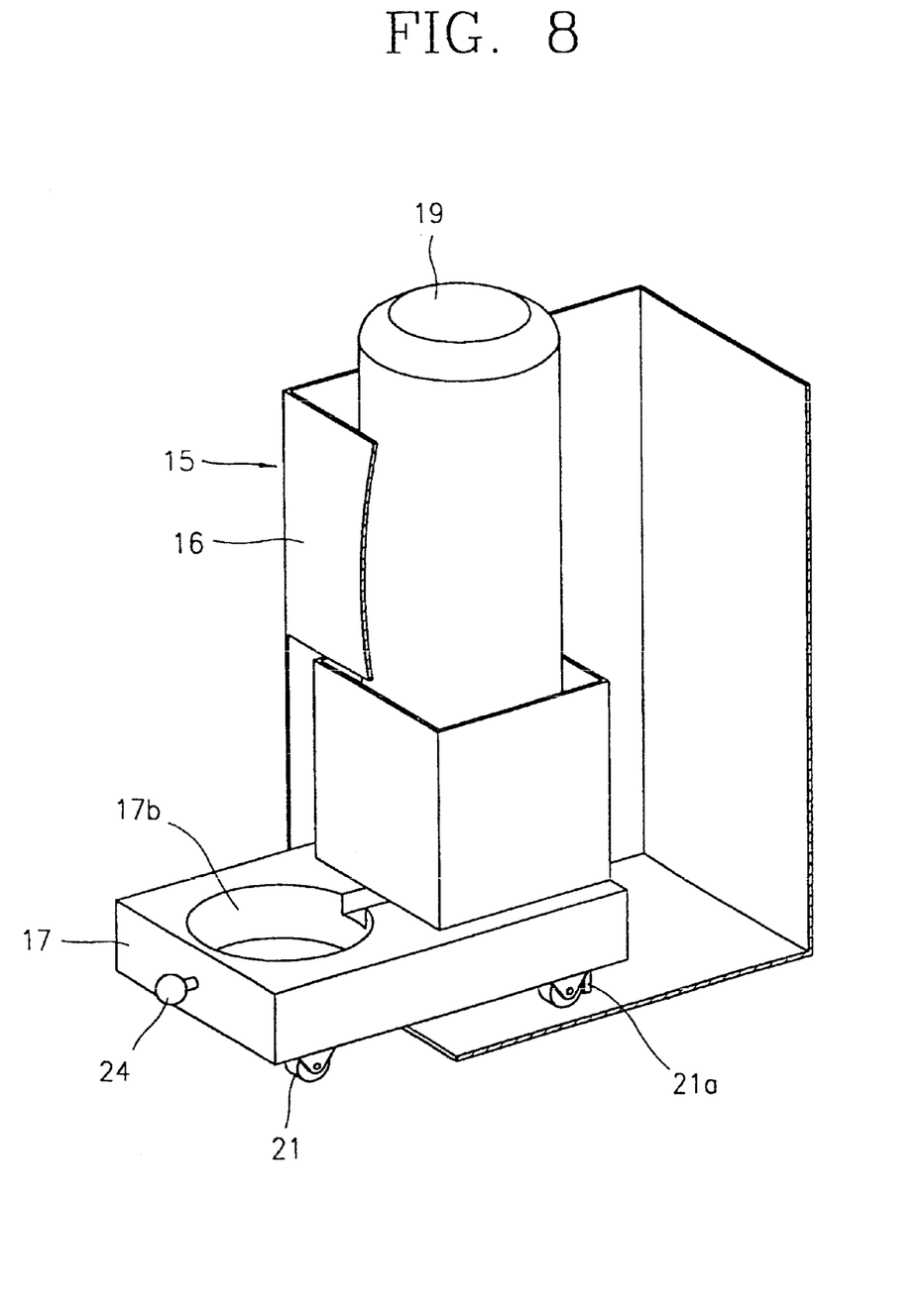
FIG. 8 is a cross-perspective view illustrating part of a water supply unit of an automatic fodder supplying apparatus in accordance with the present invention.

Meanwhile, a water supply means 15 can be further comprised in the automatic fodder supplying apparatus in accordance with the present invention, as depicted in FIG. 8, in the water supply means 15, a second slide case 17 including a holder 24 is combined to the front lower surface of a water supply box 16 so as to be open/closed such as a drawer type.

Figure 9:
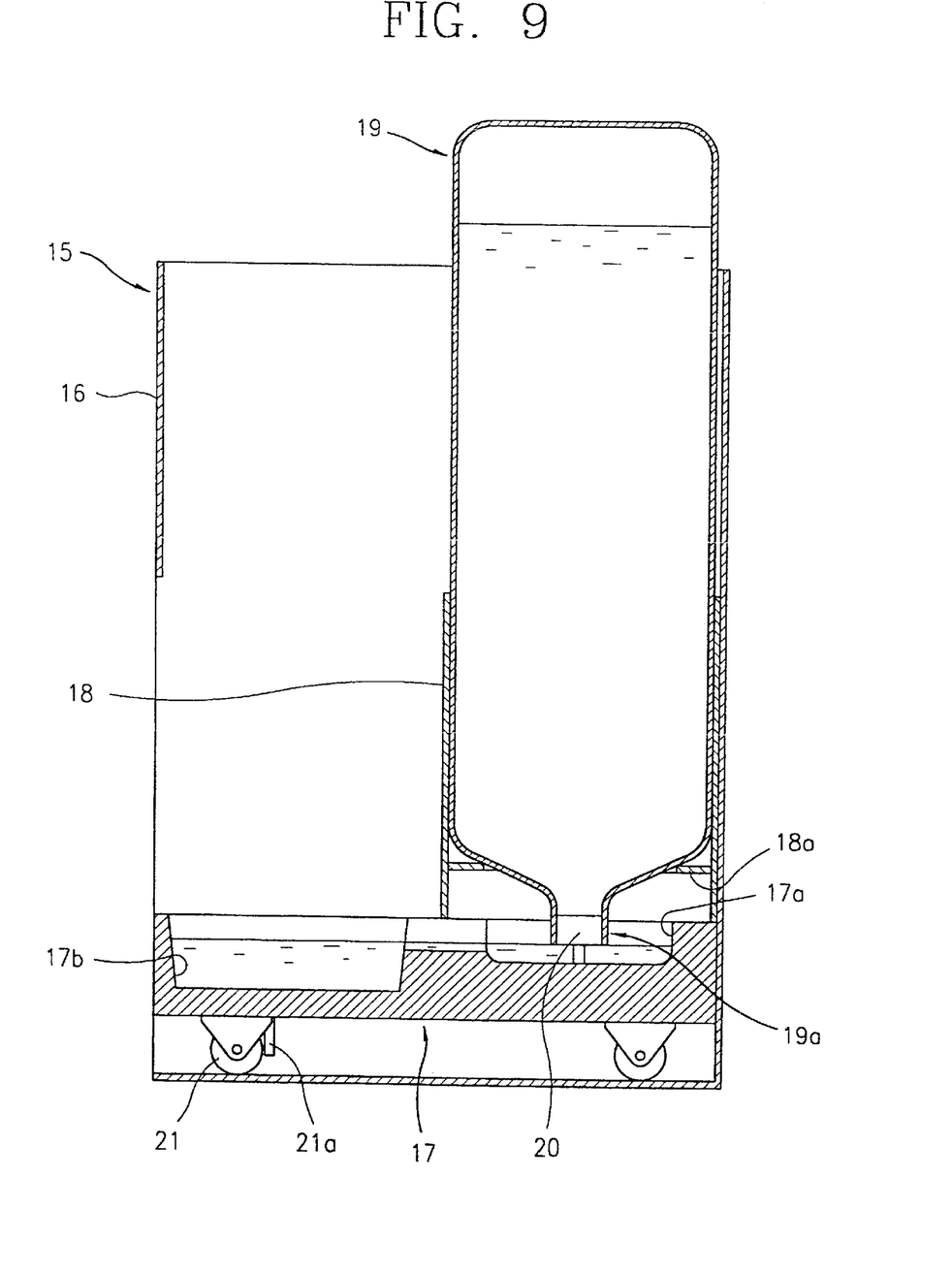
FIG. 9 is a cross-sectional view illustrating a water supply unit of an automatic fodder supplying apparatus in accordance with the present invention.

And, as depicted in FIG. 9, in the water supply box 16, a water bottle combining unit 18 is formed in order to insert a water bottle 19 tightly into the water supply box 16, and a water bottle support unit 18a is formed on the inner both side wall of the water bottle combining unit 18.

And, when a valve 20 of the water bottle 19 combined inside of a water discharge hole 19a is installed on the water bottle combining unit 18, a water discharge unit 17a is formed on the portion of the second slide case 17 placed on the lower portion of the water discharge hole 19a of the water bottle 19, a water storing unit 17b is formed on the front portion of the water discharge unit 17a so as to be connected to the water discharge unit 17a, accordingly the water discharged inside of the water discharge unit 17a from the water bottle 19 flows into the water storing unit 17b.

Herein, the quantity of the water put into the water discharge unit 17a and water storing unit 17b is set in accordance with a position of the water bottle support unit 18a.

As depicted in FIG. 9, the valve 20 combined to the water bottle 19 is constructed so as to discharge the water as same as the set quantity when the lower portion of the valve 20 is pressed by contacting to the lower surface of the water discharge unit 17a by inserting the bottle 19 into the water bottle combining unit 18, and a general push type valve which is closed again when the water bottle 19 is separated is used for the valve 20.

Accordingly, when the water of the water storing unit 17 is consumed through the valve 20, water as same as the consumed amount of the water is filled up, accordingly the set quantity of the water can be maintained always.

Meanwhile, a plurality of wheels 21 can be combined to the lower surface of the second slide case 17 in order to make the second slide case 17 move smoothly, and a move prevention member 21a can be combined in order to prevent flow after the move.

Hereinafter, the operation and effect of the automatic fodder supplying apparatus in accordance with the present invention will now be described in detail.

First, as depicted in FIG. 4, the fodder F is put into the hopper type supply unit 2 of the fodder supply box 1, a fodder discharge interval is set by operating the timer comprised in the control unit, as depicted in FIG. 3, the first slide case 8 is taken out outwardly from the fodder supply box, and the feeder 10 is placed on the straight lower portion of the discharge portion 7.

Herein, the certain constant feed case 5 is used in accordance with the amount of the fodder F among the plurality of sizes, for example, a large size constant feed case 5 as depicted in FIG. 6 or a small size constant feed case 5 as depicted in FIG. 7 can be used.

In supply of same fodder, the quantity of the fodder can be discharged up to 8 times of the constant feed case 5 by adjusting the rotation times.

After that, after the time set by the timer has passed, the deceleration motor 4 operates, as depicted in FIG. 5B, the rotary barrel 3 rotates, the fodder F put into the constant feed case 5 is discharged downwardly, herein, the fodder F is guided by the discharge guide member 6 and is discharged through the discharge portion 7, and is put into the feeder 10.

As described above, as depicted in FIG. 5B, according to the rotation of the rotary barrel 3, the operator 13 combined to the shaft 3a of the rotary barrel 3 rotates together, the rotator is separated from the micro switch 12, the contact point of the micro switch 12 is separated, after the rotary barrel 3 rotates one time by the rotation force of the deceleration motor 4, the operator 13 is contacted again to the contact point of the micro switch 12, the operation of the deceleration motor 4 is controlled by the detect signal, and the rotation of the rotary barrel 3 stops. The above-described operations are performed repeatedly.

And, when the fodder F is discharged into the feeder 10, the sound occurrence means and/or lighting means can be operated in accordance with the detect signal of the micro switch 12, in this case the fodder supplying operation can be performed more efficiently because the pet can detect the discharge of the fodder F more easily.

Meanwhile, the water supply means 15 supplies the water by inserting the water bottle 19 into the water bottle combining unit 18 of the water supply box 16, when the water bottle 19 is inserted into the water bottle combining unit 18, the lower portion of the valve 20 combined to the water discharge hole 19a of the water bottle 19 is pressed by contacting to the lower surface of the water discharge unit 17a of the second slide case 17, the set amount of the water is discharged, the water discharged into the water discharged unit 17a flows into the water storing unit 17b.

Accordingly, when the first slide case 8 and second slide case 17 are taken out from the fodder supply box 1 and water supply box 16 to the outwardly, the pet can have the water as well as the fodder F.

For example, in the automatic fodder supplying apparatus in accordance with the present invention, the rotary barrel 3 can be set so as to supply the fodder F three times per a day, namely, at 7, 12, 19 o'clock, the constant feed case 5 can be custom-manufactured as 3~4 sizes such as net contents 20g, 30g, 40g, 50g etc., the quantity of the fodder can be adjusted. up to 8 times of the constant feed case, the can be adapted freely regardless of that.

In addition, it is advisable to use the automatic fodder supplying apparatus in accordance with the present invention for the pets and small size animals, but it can be embodied many ways according to the kind of the animal.

INDUSTRIAL APPLICABILITY

The automatic fodder supplying apparatus in accordance with the present invention discharges fodder in a constant feed case combined to a rotary barrel by rotating the rotary barrel with a deceleration motor, accordingly it is easy to construct, manufacture, and can use stably for a ling In addition, different sizes of the constant feed cases can be used in case of needs, accordingly the amount of the fodder can be adjusted easily in accordance with the kind of the animal, and because a noise and fodder lost prevention member is combined to the lower portion of a hopper type supply unit, the present invention can prevent noise occurrence in the fodder supply. Because a slide case where a feeder is mounted can be inserted into a fodder supply box, it is possible to keep simply when the apparatus is not used, and the present invention can provide water automatically with the fodder.

In addition, the present invention can inform the fodder supply with a display means such as a sound occurrence means and/or lighting means to the animal, accordingly the supply efficiency can improve.

In addition, in everyday or long-term absence or trip of a breeder, various kinds of the fodder can be provided smoothly in accordance with a interval set with a timer at home, a cage, a laboratory etc., and it is possible to manage large number of animals by one person.

As the present invention may be embodied in several forms without departing from the spirit or essential characteristic thereof, it should also be understood that the above-mentioned embodiments are not limited by any of the foregoing description, unless otherwise specified, but rather should be constructed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An automatic fodder supplying apparatus, comprising:
    a fodder supply box including a supply unit containing the fodder therein;
    a rotary barrel rotatively installed inside of the fodder supply box and including a receiving groove inside;
    a shaft combined to the rotary barrel to the axial direction;
    a deceleration motor combined to the shaft; and
    a rotation detection means including a micro switch fixedly combined to the side wall of the fodder supply box, and an operator fixedly combined to the shaft.

2. The automatic fodder supplying apparatus according to claim 1, further comprising a first slide case combined to a front lower portion of the fodder supply box so as to be openable and a feeder inserted into the first slide case.

3. The automatic fodder supplying apparatus according to claim 1, wherein a constant feed case having different sizes is detachably combined to the receiving groove.

4. The automatic fodder supplying apparatus according to claim 1, wherein the supply unit comprises:
    first guide plates separately combined to upper side surfaces of the fodder supply box so as to form an opening, and fixed so as to be inclined; and
    a noise and fodder lost prevention member fixed to a lower portion of the first guide plates.

5. The automatic fodder supplying apparatus according to claim 4, wherein the noise and fodder lost prevention member is a brush.

6. The automatic fodder supplying apparatus according to claim 1, further comprising a discharge portion formed on the front lower portion of the fodder supply box; and a discharge guide member formed on a lower portion the rotary barrel.

7. The automatic fodder supplying apparatus according to claim 6, wherein the discharge guide member comprises:
    a second guide plate placed so as to surround the both side portions and lower portion of the rotary barrel; and
    a discharge guide unit having a hopper shape combined between the second guide plate and discharge portion.

8. The automatic fodder supplying apparatus according to claim 1, further comprising a water supply means placed on the side portion of the fodder supply box.

9. The automatic fodder supplying apparatus according to claim 8, wherein the water supply means comprises:
    a water supply box combined to the side portion of the fodder supply box;
    a water bottle combining unit formed inside of the water supply box so as to be inserted by the water bottle;
    a water bottle support portion formed on an inner lower portion of the water bottle combining unit;
    a second slide case combined to a lower portion of the water bottle combining unit so as to be movable; a water discharge portion of the water bottle; a water storing unit connected to the water discharge portion; and a push type valve combined inside of the water discharge portion of the water bottle.

10. The automatic fodder supplying apparatus according to claim 9, wherein at least one wheel is combined to the bottom surface of the second slide case.

11. The automatic fodder supplying apparatus according to claim 10, wherein a move prevention member is combined to the side of the wheel.

\* \* \* \* \*